(12) United States Patent
Ozasa et al.

(10) Patent No.: US 7,340,315 B2
(45) Date of Patent: Mar. 4, 2008

(54) DESIGN SUPPORTING SYSTEM FOR SUPPORTING COMPONENT DESIGN

(75) Inventors: Kenji Ozasa, Tokyo (JP); Kazuyuki Matsuda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 171 days.

(21) Appl. No.: 10/527,793

(22) PCT Filed: Dec. 7, 2004

(86) PCT No.: PCT/JP2004/018534
§ 371 (c)(1),
(2), (4) Date: Feb. 17, 2006

(87) PCT Pub. No.: WO2005/057435
PCT Pub. Date: Jun. 23, 2005

(65) Prior Publication Data
US 2006/0142883 A1 Jun. 29, 2006

(30) Foreign Application Priority Data
Dec. 10, 2003 (JP) .............................. 2003-411920

(51) Int. Cl.
*G06F 19/00* (2006.01)
*G06F 7/00* (2006.01)
*G06F 17/00* (2006.01)
*G06G 7/48* (2006.01)
*G06G 7/58* (2006.01)

(52) U.S. Cl. .................... 700/97; 707/104.1; 703/6; 703/12; 702/22; 702/30

(58) Field of Classification Search ................ 700/97; 702/22, 30; 703/6, 12; 707/104.1
See application file for complete search history.

(56) References Cited

U.S. PATENT DOCUMENTS

| 6,934,640 | B2 * | 8/2005 | Ichikawa et al. ............. 702/31 |
| 7,200,251 | B2 * | 4/2007 | Joshi et al. ................. 382/128 |
| 2001/0056308 | A1 * | 12/2001 | Petrov et al. ................. 700/98 |
| 2002/0004768 | A1 * | 1/2002 | Sekine et al. ................ 705/28 |
| 2002/0010550 | A1 * | 1/2002 | Grass et al. .................. 702/19 |
| 2002/0133302 | A1 * | 9/2002 | Matsui et al. ................ 702/30 |
| 2004/0133596 | A1 * | 7/2004 | Fujita et al. ............. 707/104.1 |
| 2006/0195419 | A1 * | 8/2006 | Tenma et al. .................. 707/2 |
| 2007/0191257 | A1 * | 8/2007 | Andretta et al. .............. 512/1 |

FOREIGN PATENT DOCUMENTS

| EP | 1 298 555 A1 | 4/2003 |
| JP | 2002-251416 | 9/2002 |

* cited by examiner

Primary Examiner—Ronald Hartman, Jr.
(74) Attorney, Agent, or Firm—Pillsbury Winthrop Shaw Pittman, LLP

(57) ABSTRACT

A design supporting system includes a unit that acquires, from a component design supporting program which is executed in a client terminal, component design information including volume information indicative of a volume of a designed component, a unit that generates list information that is indicative of a list of names of usable materials for the component classification corresponding to the designed component, and sends the list information to the client terminal, an acquisition unit that acquires, from the material database, controlled substance information corresponding to the material name that is selected from the list information by the client terminal, a unit that calculates a content of the controlled substance that is included in the designed component when the material of the selected material name is applied to the designed component, and a unit that outputs the calculated content of the controlled substance as evaluation information of the designed component.

12 Claims, 12 Drawing Sheets

MATERIAL DATABASE

| MATERIAL USE PERMISSION/NON-PERMISSION | KIND | TRADE NAME | GRADE | MAKER INFORMATION | PHYSICAL PROPERTY VALUE | | | | |
|---|---|---|---|---|---|---|---|---|---|
| | | | | | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| ○ | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| × | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| ○ | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| ○ | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| ○ | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| ○ | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| ○ | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| ○ | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| ○ | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| × | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| ○ | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| ○ | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |
| ○ | | | | MAKER INFORMATION | MECHANICAL CHARACTERISTIC | CONTROLLED SUBSTANCE CONTENT | USE/NON-USE OF CONTROLLED SUBSTANCE IN MANUFACTURING PROCESS | COLOR INFORMATION |

| COMPONENT CODE | NAME | CLASSIFICATION | FILE NAME | MATERIAL | VOLUME | WEIGHT | COST | ATTACHMENT FILE | REMARKS |
|---|---|---|---|---|---|---|---|---|---|
| DETAIL | | | | | | | | | |
| DETAIL | | | | | | | | | |
| DETAIL | | | | | | | | | |
| DETAIL | | | | | | | | | |

DESIGN INFORMATION MANEGEMENT SYSTEM

DESIGN SUPPORTING SYSTEM FOR SUPPORTING COMPONENT DESIGN

CROSS REFERENCE TO RELATED APPLICATION

This is the U.S. National Stage of PCT/JP2004/018534, filed Dec. 7, 2004, which in turn claims priority to Japanese Patent Application No. 2003-411920, filed Dec. 10, 2003, both of which are incorporated herein in their entirety by reference.

TECHNICAL FIELD

The present invention relates to a design supporting system for supporting component design, which is executed in a client terminal.

BACKGROUND ART

In recent years, various three-dimensional CAD (Computer-Aided Design) software with a 3D drawing support function has been developed. Using the 3D CAD software, the three-dimensional shapes of components, such as mechanical parts, can precisely be designed.

In addition, a system for supporting design of various commodities in consideration of the effect on the environment has been developed.

Jpn. Pat. Appln. KOKAI Publication No. 2002-251416 discloses a system for supporting design of a commodity. This system supports commodity design using, for example, information relating to a total cost that is incurred in a life cycle of a commodity, information relating to the effect of the commodity on the environment during the life cycle, and information relating to marketing.

This system, however, has no function of evaluating selection of material that is applied to a component designed by using 3D CAD software.

In general, materials have their own physical property values. Depending on the choice of a material that is applied to a designed component, a component including a substance, the use of which is not permitted, may be manufactured, or a component including more than a permissible amount of controlled substance may be manufactured.

The amount of controlled substance that is included in the designed component increases as the volume of the designed component becomes larger.

It is necessary, therefore, to provide a scheme for supporting proper material selection and component volume design in cooperation with a component design supporting program such as 3D CAD software.

DISCLOSURE OF INVENTION

According to an embodiment of the present invention, there is provided a design supporting system which is connected to a client terminal over a network and supports component design which is executed in the client terminal, the system comprising: a storage device which stores a material database for managing, with respect to each of materials, a material name of each material, controlled substance information indicative of a content of each of controlled substances included in the material, and discrimination information indicative of permission/non-permission of use of the material; a design information acquisition unit configured to cooperate with a component design supporting program, which is executed by the client terminal, and acquire, from the component design supporting program via the network, component design information including volume information indicative of a volume of a component which is designed using the component design supporting program; a determination unit configured to determine, when a material selection request relating to the designed component is input from the client terminal via the network, whether each of materials stored in the material database is a usable material for a component classification corresponding to the designed component, based on the discrimination information and information indicative of a relationship between the component classification and usable materials for the component belonging to the component classification; a generation unit configured to generate, based on a result of the determination, list information indicative of a list of names of usable materials for the component classification corresponding to the designed component, and send the list information to the client terminal over the network; a controlled substance information acquisition unit configured to acquire, from the material database, controlled substance information corresponding to the material name which is selected from the list information by the client terminal; a calculation unit configured to calculate, based on the acquired controlled substance information and the volume information included in the acquired component design information, a content of the controlled substance which is included in the designed component when the material of the selected material name is applied to the designed component; and an output unit configured to output the calculated content of the controlled substance as evaluation information of the designed component.

BRIEF DESCRIPTION OF DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 5 shows an example of a material information screen that is presented on a client terminal by the material management system used in the design supporting system according to the embodiment;

FIG. 6 shows an example of a controlled material information screen that is presented on the client terminal by the material management system used in the design supporting system according to the embodiment;

FIG. 7 shows an example of a design information screen that is presented on the client terminal by the design information management system used in the design supporting system according to the embodiment;

FIG. 8 shows an example of a detailed information screen that is presented on the client terminal by the design information management system used in the design supporting system according to the embodiment;

BEST MODE FOR CARRYING OUT THE INVENTION

An embodiment of the present invention will now be described with reference to the accompanying drawings.

Figure 1:
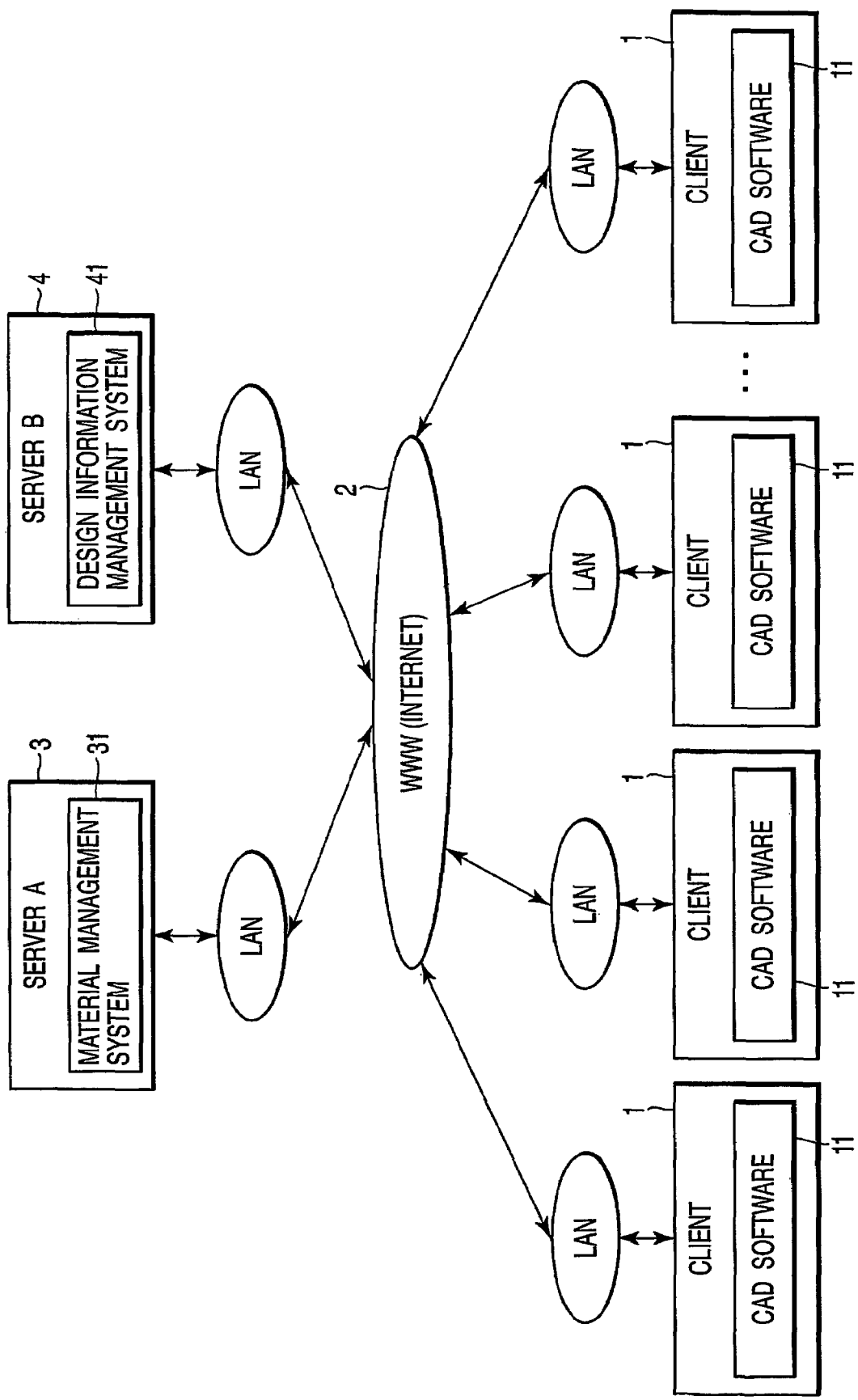
FIG. 1 is a block diagram that shows the entire structure of a computer network system that constitutes a design supporting system according to an embodiment of the present invention.

FIG. 1 shows the structure of a computer network system that constitutes a design supporting system according to an embodiment of the present invention. This design supporting system is a system for supporting component design, which is executed by each of a plurality of client terminals 1. The design supporting system is realized by server computers 3 and 4. The server computers 3 and 4 are connected to each client terminal 1 via a network 2 such as the Internet or an intranet.

Each client terminal 1 is composed of, e.g. a personal computer. The client terminal 1 includes, as hardware, an input device, an arithmetic device, an output device, a storage device and a communication device. A component design supporting program, such as 3D CAD software 11, is installed in each client terminal 1. An individual designer can perform a component design work using a design supporting function (modeling, drawing, etc.) that is provided by the 3D CAD software in his/her own client terminal 1.

The server computer (A) 3 is loaded with a program that functions as a material management system 31. The server computer (B) 4 is loaded with a program that functions as a design information management system 41.

Each of the server computers 3 and 4 includes, as hardware, an input device, an arithmetic device, an output device, a storage device and a communication device.

The material management system 31 is a system that manages a material database for managing the name of each of materials and the related physical property value information. The physical property value information of the material database includes information indicative of characteristic values of each material (e.g. mechanical characteristic such as an elastic modulus), and controlled substance information indicative of the content of each of controlled substances included in each material. Further, the material database stores discrimination information indicative of whether the use of each of the materials is, for example, legally permitted at present.

The design information management system 41 is a system that manages design information of each of components that are designed using the 3D CAD software 11 in each client terminal 1. The design information management system 41 functions as PDM (Product Management) system that manages, as achievement results, the design information of components of each product.

The design information management system 41 has a function of cooperating with the 3D CAD software 11 of each client terminal 1 and the material database in the material management system 31. Using the cooperating function, the design information management system 41 supports proper material selection and design of component volume for each client terminal 1.

Figure 2:
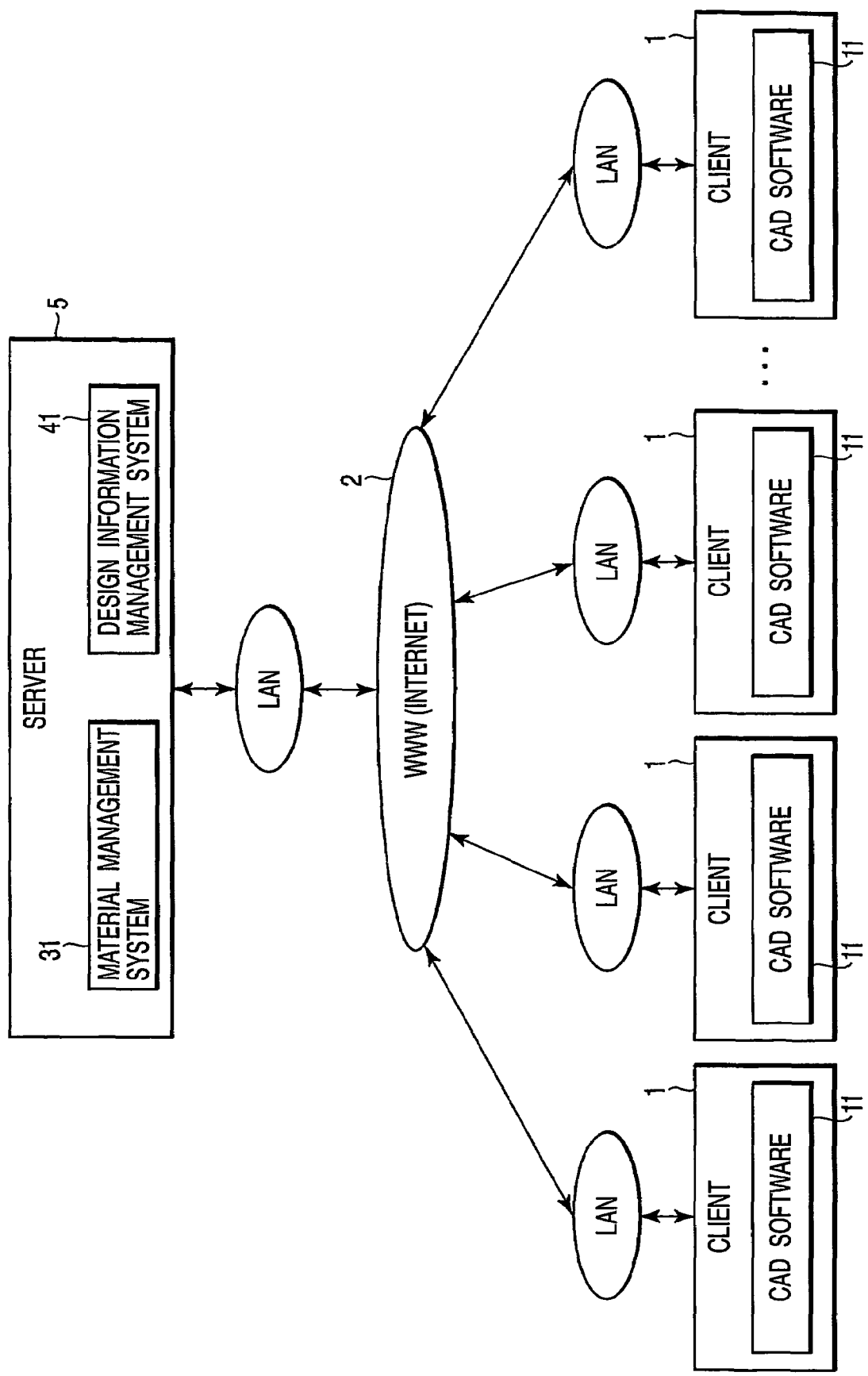
FIG. 2 is a block diagram showing another example of the computer network system that constitutes the design supporting system according to the embodiment.

The material management system 31 and design information management system 41 may be provided in the same server computer. FIG. 2 shows an example of system configuration in which the material management system 31 and design information management system 41 are provided in the same server computer.

Figure 3:
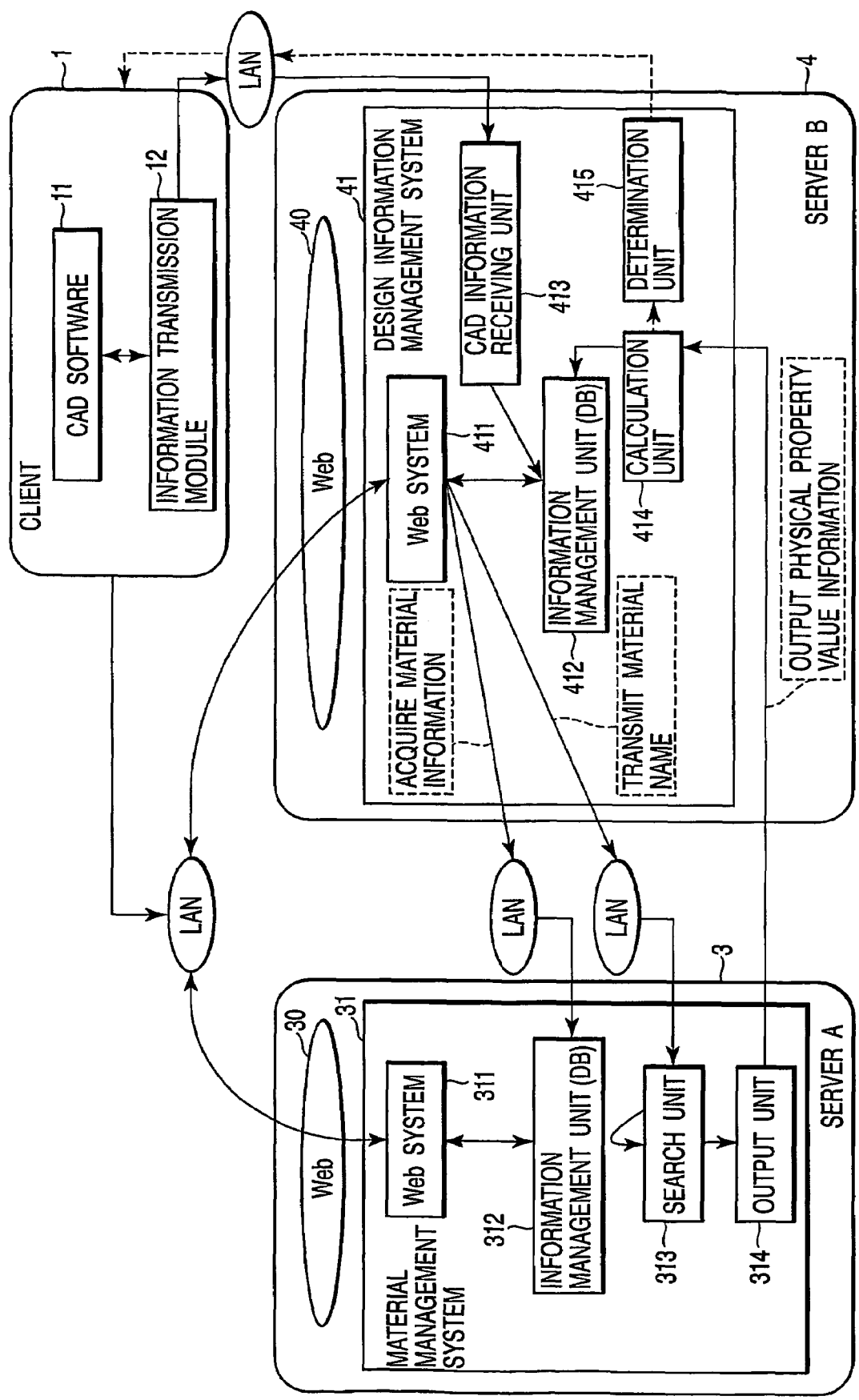
FIG. 3 is a block diagram that shows the structures of a design information management system and a material management system, which are used in the design supporting system according to the embodiment.

Referring now to FIG. 3, the structures of the client terminal 1, material management system 31 and design information management system 41 are described. FIG. 3 corresponds to the system configuration shown in FIG. 1.

The client terminal 1 includes an information transmission module 12, as well as the 3D CAD software 11. The information transmission module 12 is a program for enabling cooperation between the 3D CAD software 11 and the design information management system 41. The information transmission module 12 acquires, from the 3D CAD software 11, design information of a component that is designed by the 3D CAD software 11, and transmits the acquired design information to the design information management system 41 over the network. The design information, which is transmitted to the design information management system 41, includes the file name of a CAD file corresponding to the designed component, attribute information indicative of, e.g. the classification of the designed component, and volume information indicative of the volume of the designed component.

The server computer (A) 3 includes a Web server 30, as well as the aforementioned material management system 31. The material management system 31 includes a Web system 311, an information management unit 312, a search unit 313 and an output unit 314. The Web system 311 is a program for cooperation with the Web server 30. The information management unit 312 is a database management program for managing the aforementioned material database. The information management unit 312 manages the material database that is stored in a storage device of the server computer (A) 3. The information management unit 312 provides the Web browser of each client terminal 1 with services relating to registration of data in the material database and browsing of the material database. As regards the registration of data in the material database, for example, an authentication process may be executed so as to permit only the administrator to execute the registration process. The information management unit 312 also includes a function of providing the design information management system 41 with the name of each material and the physical property value information of each material, which are registered in the material database.

The search unit 313 is a program for searching the material database for physical property value information, such as controlled substance information, which corresponds to the material name designated by the design information management system 41. The physical property value information that is retrieved by the search unit 313 is delivered to the design information management system 41 by the output unit 314.

The server computer (B) 4 includes a Web server 40, as well as the aforementioned design information management system 41. The design information management system 41 includes a Web system 411, an information management unit 412, a CAD information receiving unit 413, a calculation unit 414, and a determination unit 415. The Web system 411 is a program for enabling cooperation with the Web server 40. The information management unit 412 is a program for managing, as a design information database, design information of each of components that are designed by the respective client terminals 1. The design information database is stored in a storage device of the server computer (B) 4. An access request to the design information database from each client terminal 1 is input to the Web system 411 via the Web server 40.

The CAD information receiving unit 413 is a program for enabling cooperation with the CAD software 11 of each client terminal 1 in cooperation with the information transmission module 12 of the client terminal 1. The CAD information receiving unit 413 acquires component design information, which includes volume information indicative of the volume of the component designed by the CAD software 11, from the CAD software 11 via the network 2. The design information, which is sent from the information transmission module 12 of the client terminal 1, is received by the CAD information receiving unit 413. The component design information, which is received by the CAD information receiving unit 413, is stored in the design information database that is managed by the information management unit 412.

The information management unit 412 also includes a function of supporting material selection for each client terminal 1. In order to realize the supporting function for the material selection, the information management unit 412 manages, as a classification/material correspondency table, mapping information that is indicative of the relationship between component classifications and usable materials for components belonging to the classifications. If the Web system 411 receives a material selection request that is sent from the client terminal 1, the information management unit 412 executes a material selection supporting process.

In the material selection supporting process, the information management unit 412 acquires material information (e.g. material name and discrimination information in association with each material) from the material database of the material management system 31 via the Web system 411. Based on the mapping information and the acquired discrimination information, the information management unit 412 discriminates whether each of the materials registered in the material database is usable for a component classification corresponding to the component, for which the material selection is requested. Based on the discrimination result, the information management unit 412 generates material name list information that is representative of a list of names of usable materials, and sends the material name list information to the client terminal 1 via the Web system 411 and Web server 40.

If one material name is selected from the material name list information by the client terminal 1, the information indicative of the selected material name is sent from the client terminal 1 to the Web server 40. The information management unit 412 receives the information indicative of the selected material name via the Web system 411 and sends the selected material name to the material management system 31 via the Web system 411, thereby to acquire from the material database the physical property value information including the controlled substance information corresponding to the selected material name.

Based on the controlled substance information acquired from the material database and the volume information that is included in the design information acquired by the CAD information receiving unit 413, the calculation unit 414 calculates the content of a controlled substance that is included in a designed component when the material of the selected material name is applied to the designed component. The calculated content of the controlled substance is stored in the design information database as evaluation information of the designed component, or is output as evaluation information to an external system via the output device or communication device of the server computer (B) 4.

In addition, the calculated content of the controlled substance may be sent to the client terminal 1. In this case, the value itself of the calculated content of the controlled substance may be sent to the client terminal 1 as evaluation information. However, it is desirable that only when the content of the controlled substance is a predetermined value or more, this fact should be sent to the client terminal 1. In this case, the determination unit 415 determines whether the calculated content of the controlled substance is a predetermined value or more. If the content of the controlled substance is a predetermined value or more, the determination unit 415 sends a message to that effect to the client terminal 1, thereby prompting the client terminal 1 to execute re-design of the component or re-selection of the material.

Figure 4:
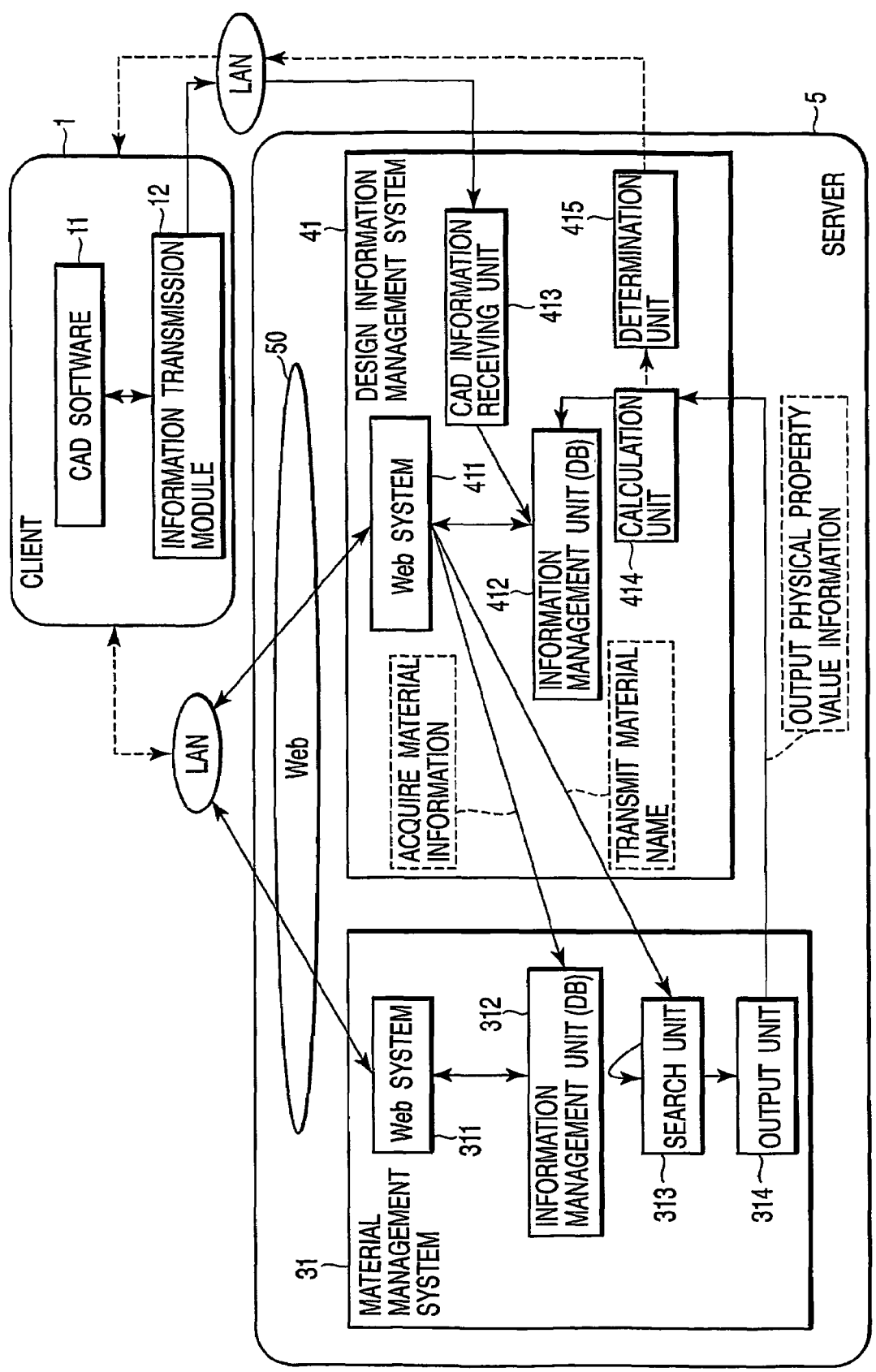
FIG. 4 shows an example in which a design information management system and a material management system, which are used in the design supporting system according to the embodiment, are provided in the same server computer.

FIG. 4 shows the structures of the material management system 31 and design information management system 41, which correspond to the system configuration shown in FIG. 2. The server computer 5 includes a Web server 50, the material management system 31 and design information management system 41. The material management system 31 and design information management system 41 have the same structures as those shown in FIG. 3.

Next, referring to FIG. 5, the structure of the material database that is managed by the material management system 31 is described.

FIG. 5 shows an example of the screen that is presented to the client terminal 1 by the material management system 31. In the material database, records of individual materials are defined. Each record defines a "material use permission/non-permission" field, a "kind" field, a "trade name" field, a "grade" field, a "maker information" field, and a "physical property value" field.

The "material use permission/non-permission" field is a field for storing the aforementioned discrimination information. Mark "O" indicates that the use of the material in this record is permitted at present, and mark "X" indicates that the use of the material in this record is not permitted at present. The administrator updates the "material use permission/non-permission" field, when necessary, in accordance with a change to regulations of law, etc. The administrator can thus manage the permission/non-permission of the use of all materials in a centralized manner. The "kind" field is a field for indicating the kind of the material in the record (e.g. aluminum, copper, magnesium, or polycarbonate).

The "trade name" field and "grade" field are fields for indicating the trade name and the grade of the material. The values in these fields are used as the material name that uniquely identifies the material.

The "physical property value" field is a field for managing the physical property value of the material. The "physical property value" field includes a "mechanical characteristic"

field, a "controlled substance content" field, a "use/non-use of controlled substance in manufacturing process" field, and a "color information" field.

Figure 6:
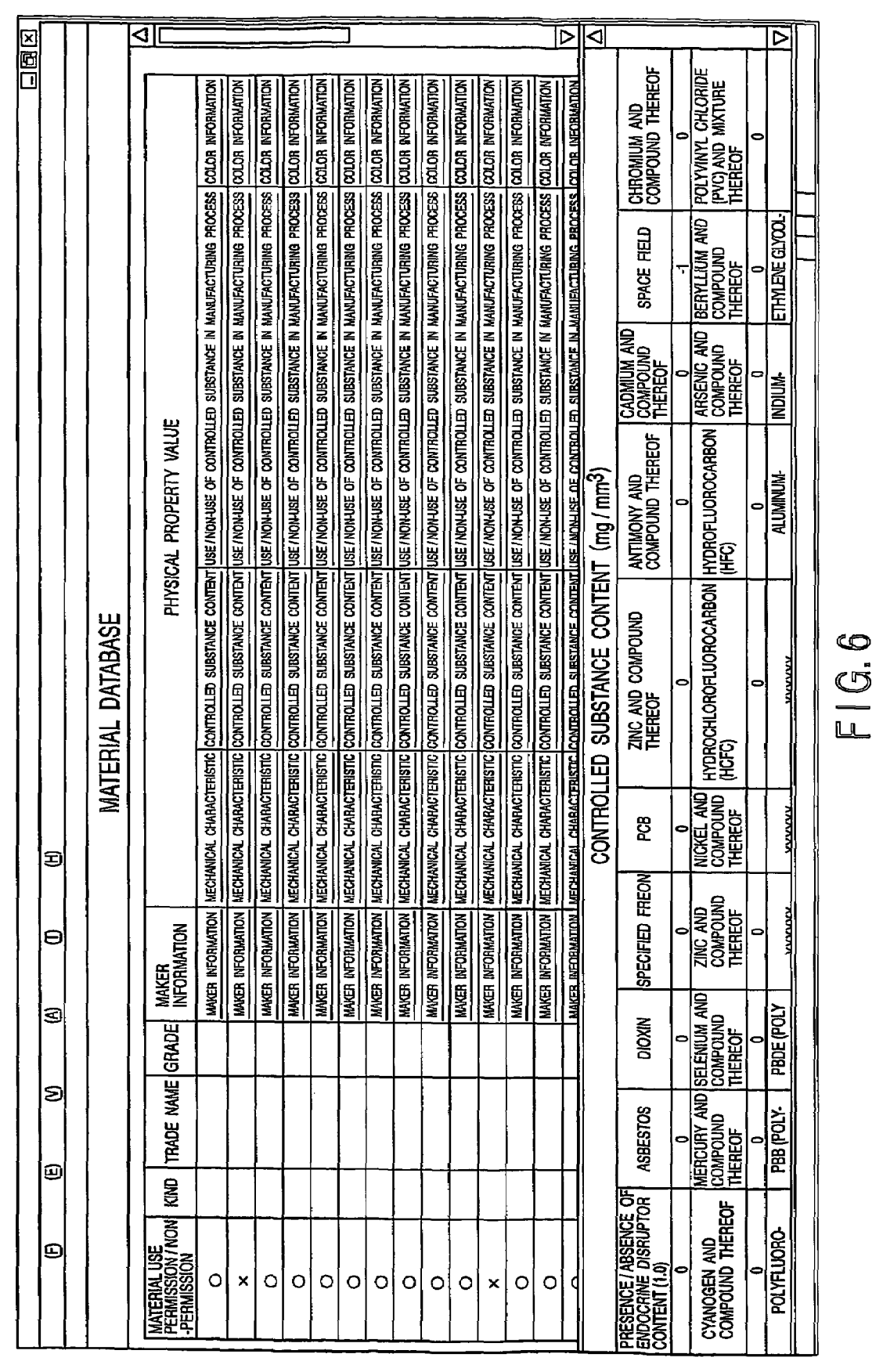

The "mechanical characteristic" field stores a physical property value indicative of the mechanical characteristic of the material (modulus of longitudinal elasticity, modulus of transverse elasticity, flexural rigidity, etc.). The "controlled substance content" field stores, as controlled substance information, the content (mg/mm$^3$) of each of controlled substances included in the material. On the screen shown in FIG. 5, if the "controlled substance content" field of a certain record is clicked, the controlled substance information relating to controlled substances included in the material of the record are displayed on the screen of the client terminal 1, as shown in FIG. 6.

Next, referring to FIG. 7, a description is given of an example of the design information database that is managed by the design information management system 41.

FIG. 7 shows an example of the screen that is presented on the client terminal 1 by the design information management system 41. The design information database defines one record for each of the components. Each time a new file for component design is created by the CAD software 11 of the client terminal 1, one record is added to the design information database. Each record includes a "component code" field, a "name" field, a "classification" field, a "file name" field, a "material" field, a "volume" field, and a "weight" field.

The "component code" field and "name" field are fields for registering the component code assigned to the component of the record, and the name of the component. The "classification" field is a field for registering information relating to a component classification (kind of forming method, kind of component, etc.) to which the component belongs. The "file name" field is a field for registering the file name of the CAD data corresponding to the component. The "material" field is a field for registering the name of the material that is selected by the designer as material to be applied to the component. The "volume" field is a field for registering the volume of the component, and the "weight" field is a field for registering the weight of the component.

Figure 8:
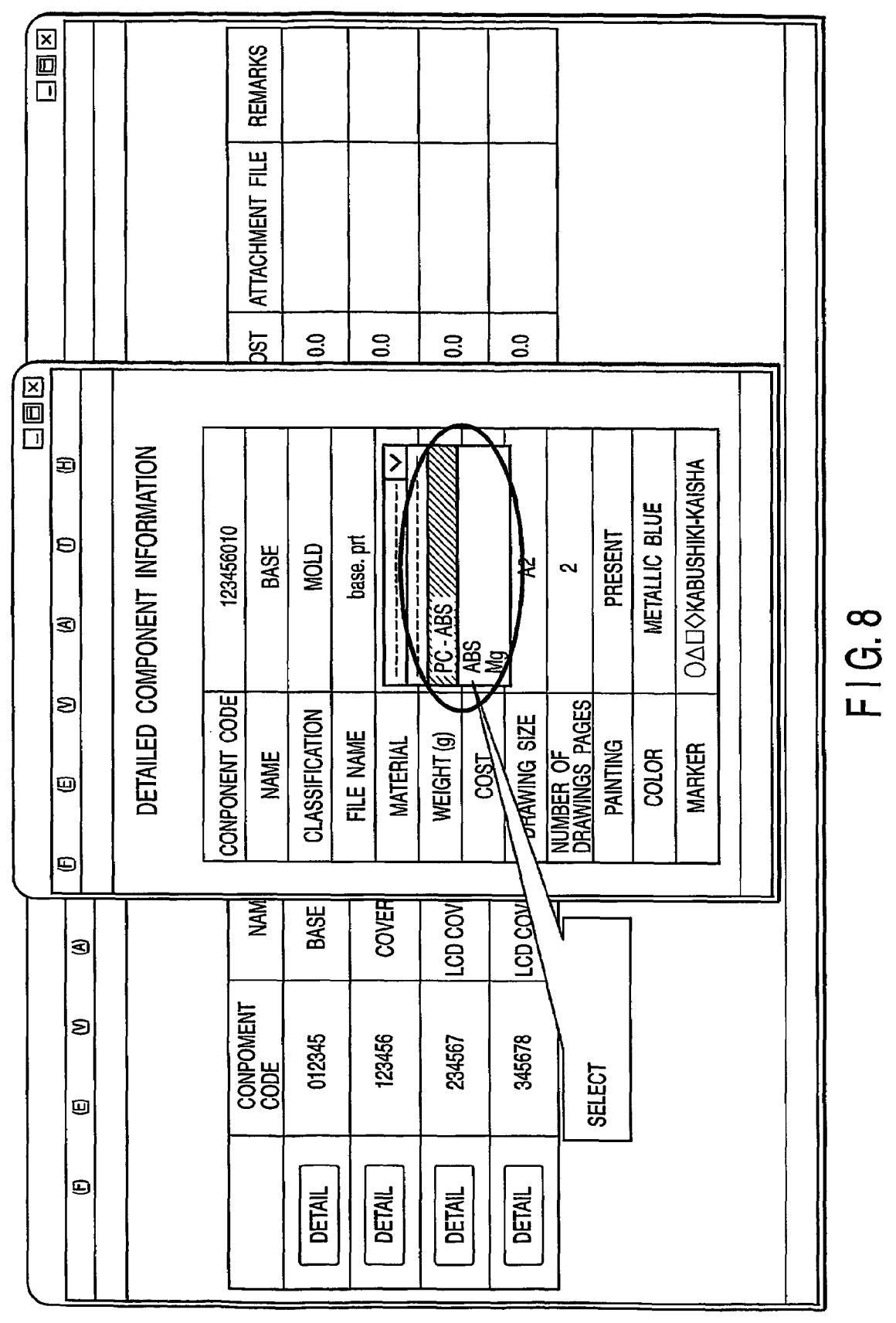

Each record in the design information database is provided with a "DETAIL" button. The "DETAIL" button is used for the client terminal 1 to input a material selection request to the design information management system 41. If the "DETAIL" button is clicked, the design information management system 41 presents to the client terminal 1 a detailed information screen of the component, as shown in FIG. 8, which corresponds to the record at which the clicked "DETAIL" button is located. The detailed information screen is provided with a pull-down menu for selecting the "material." The pull-down menu displays a list of materials that are usable for the component. The designer can select the material to be used, by referring to the pull-down menu.

Figure 9:
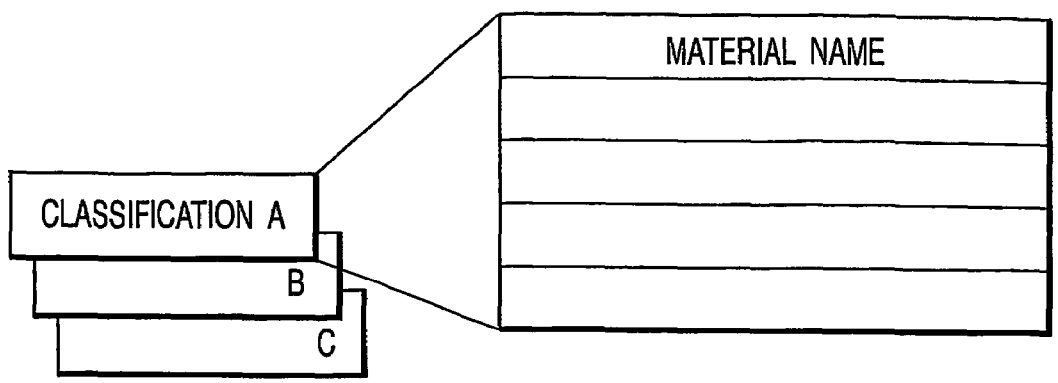
FIG. 9 shows an example of the structure of mapping information that is used in the design supporting system according to the embodiment.

FIG. 9 shows an example of the aforementioned mapping information.

The mapping information, as described above, is a classification/material correspondency table, which defines the correspondency between component classifications of components and usable materials for components belonging to the classifications. The table stores a list of usable materials with respect to each of component classifications A, B, C, . . . . The mapping information can be edited by, e.g. the administrator, when necessary.

Figure 10:
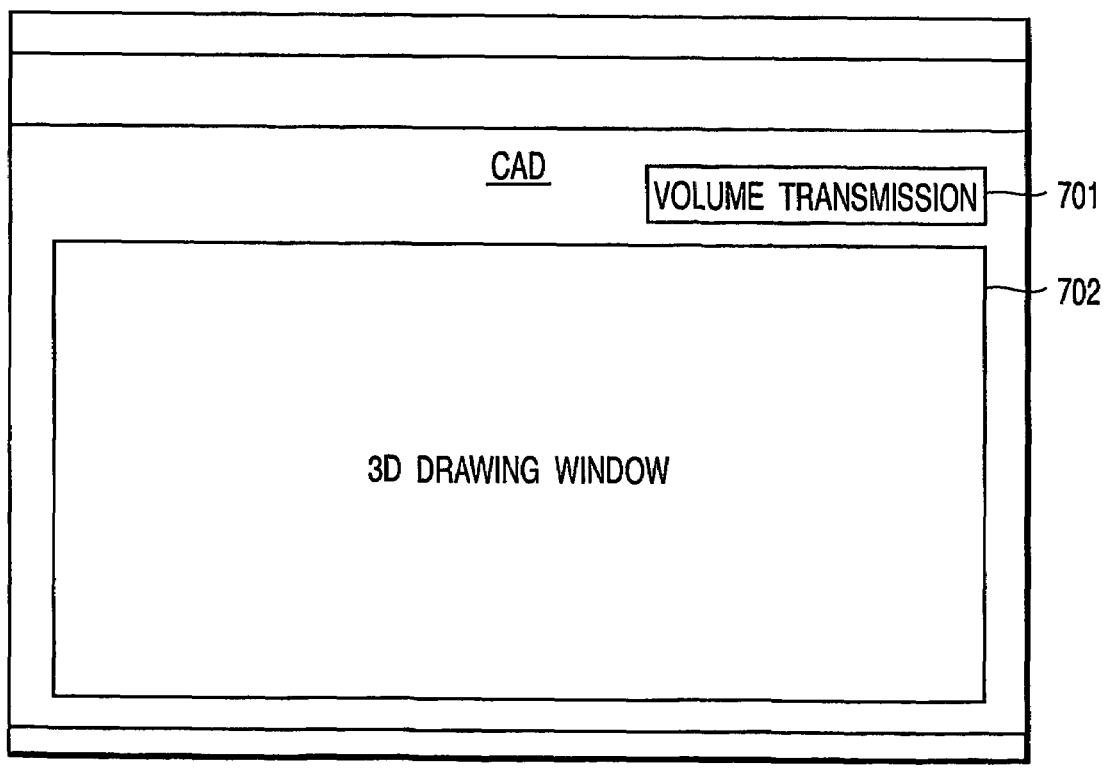
FIG. 10 shows an example of a work screen of CAD software that is used in the design supporting system according to the embodiment.

FIG. 10 shows an example of a work screen that is displayed on the client terminal 1 by the CAD software 11. The screen includes a "volume transmission" button 701 and a 3D drawing window 702 for drawing a 3D component shape. If the "volume transmission" button 701 is clicked after the component is drawn on the 3D drawing window 702, the information transmission module 12 acquires the design information including the volume information from the CAD software 11. The information transmission module 12 sends the acquired design information to the design information management system 41.

Figure 11:
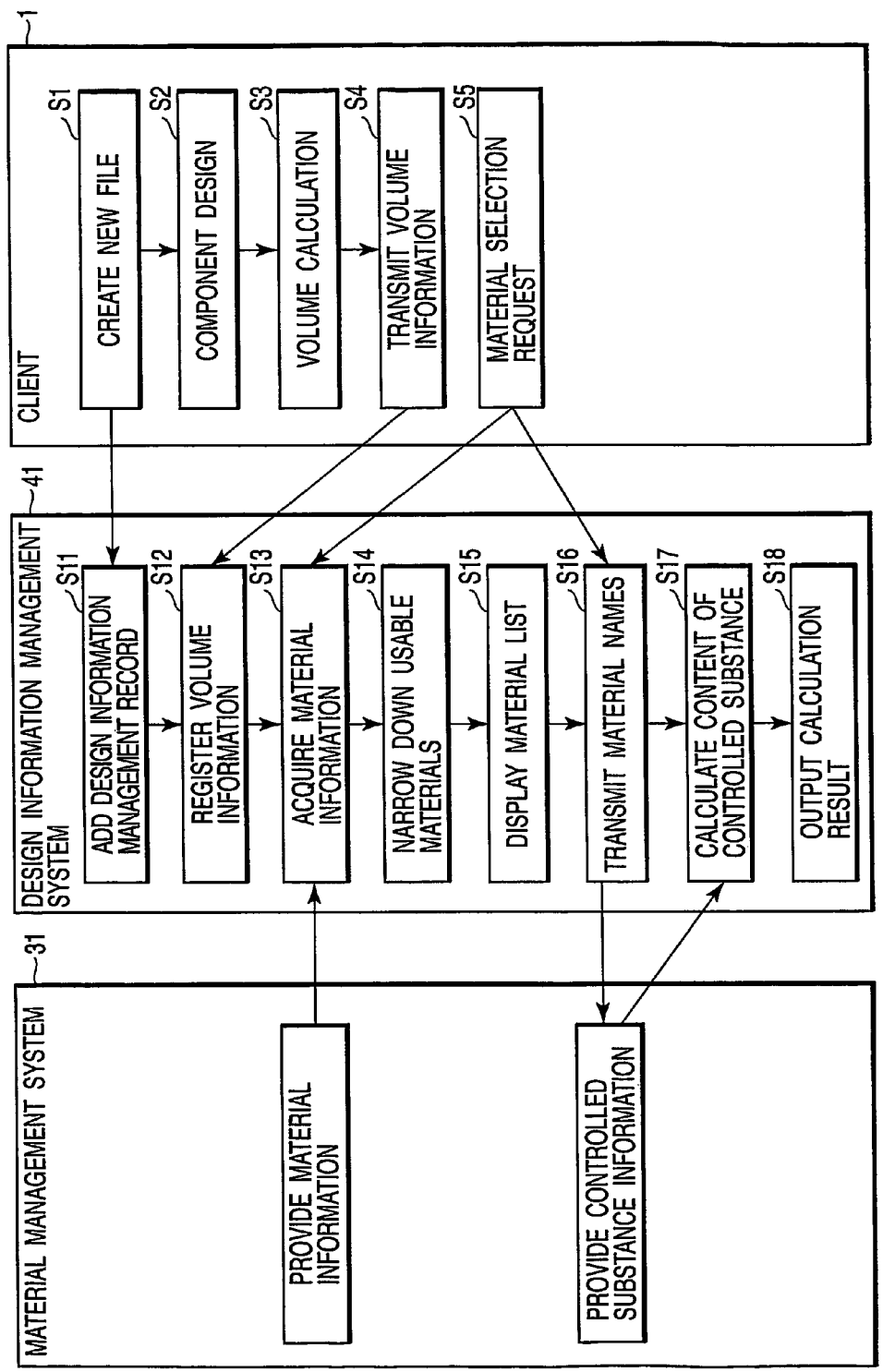
FIG. 11 is a flow chart illustrating an operation of the design supporting system according to the embodiment.

Referring now to FIG. 11, the operation of the system shown in FIG. 3 is described.

If a new file is created by the CAD software 11 in the client terminal 1 (step S1), the file name of the new file is sent by the information transmission module 12 to the design information management system 41 over the network 2.

Upon receiving the file name, the design information management system 41 adds one record (design information management record) to the design information database (step S11). The file name, which is sent from the client terminal 1, is automatically registered in the "file name" field of the added design information management record. Thereby, the component that is designed in the client terminal 1 is associated with the record in the design information database in one-to-one correspondence.

In the client terminal 1, a component design work is performed using the CAD software 11 (step S2). If the designer clicks the "volume transmission" button 701 following the completion of the component design, the CAD software 11 calculates the volume of the component on the basis of the shape and dimensions of the designed component (step S3). The information transmission module 12 acquires from the CAD software 11 the component design information that includes volume information indicative of the calculated volume and classification information indicative of the classification of the designed component. The information transmission module 12 transmits the acquired component design information to the design information management system 41 over the network (step S4).

In the design information management system 41, the CAD information receiving unit 413 receives the component design information from the information transmission module 12. The CAD information receiving unit 413 inputs the received component design information to the information management unit 412. In the information management unit 412, the volume information that is included in the component design information is automatically registered in the "volume" field. In a case where classification information is included in the component design information, the classification information is automatically registered in the "classification" field (step S12). The designer may input the classification information to the screen shown in FIG. 7 via the Web browser.

The client terminal 1 accesses the design information management system 41 via the Web browser in order to select the material of the designed component. If the "DETAIL" button on the screen of FIG. 7 is clicked, the client terminal 1 sends a material selection request relating to the designed component to the design information management system 41 (step S5).

Upon receiving the material selection request, the design information management system 41 acquires the discrimination information of individual materials and the material information indicative of the material names from the material database of the material management system 31 (step S13). The design information management system 41 narrows down the material names of usable materials that belong to the component classification corresponding to the component designated by the material selection request, and generates a material list indicating the usable material names that belong to the component classification corresponding to the component. The design information management system 41 sends the generated material list to the client terminal 1 (step S14, S15). The material list is displayed on the detailed information screen of FIG. 8 as a pull-down menu.

If the material name is selected on the pull-down menu in the client terminal 1, the design information management system 41 registers the selected material name in the design information database and sends the selected material name to the material management system 31 in order to acquire the controlled substance information from the material database (step S16). Upon receiving the controlled substance information associated with the selected material name from the material management system 31, the design information management system 41 multiplies the content of each controlled substance, which is designated in the acquired controlled substance information, by the volume information. Thereby, the content of each controlled substance included in the designed component is calculated on a substance-by-substance basis (step S17). Thereafter, the design information management system 41 outputs the calculated controlled substance content as evaluation information of the designed component (step S18).

As has been described above, in the design supporting system of this embodiment, the list of the material names of the materials, which are usable for the component designed by the client terminal 1, is automatically generated. The generated list is provided to the client terminal 1. Therefore, the designer can easily select the material. In addition, if the material name is selected by the client terminal 1, the content of the controlled substance, which is included in the component when the material of the selected material name is applied, is automatically calculated as evaluation information of the component, using the volume information that is included in the design information acquired from the CAD software 11 of the client terminal 1, and the controlled substance information that is registered in the material database. Thus, in the design supporting system of the present embodiment, the volume of the designed component and the selection of the material that is applied to the component can properly be evaluated in consideration of the content of controlled substances. Therefore, the selection of proper material and the design of component volume can be supported in each client terminal 1.

Figure 12:
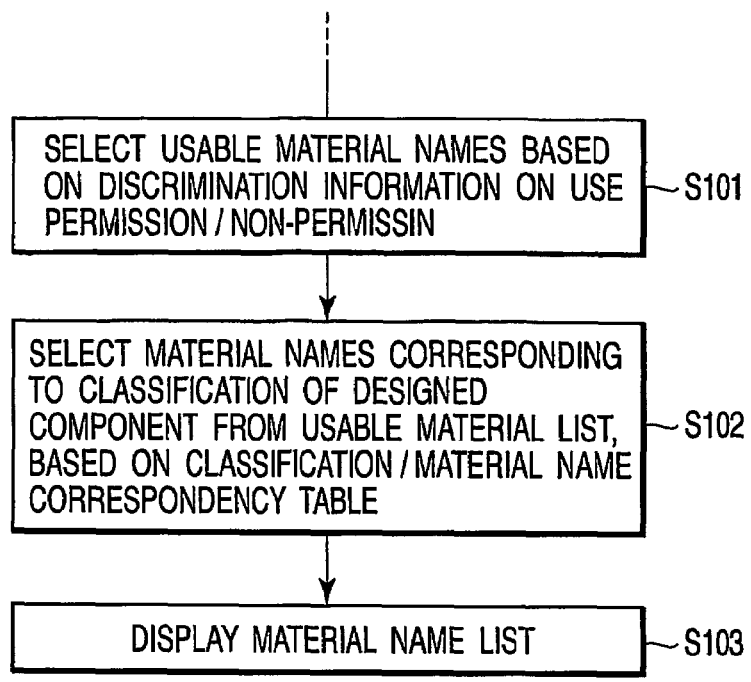
FIG. 12 is a flow chart illustrating a material narrowing-down operation that is executed by the design supporting system according to the embodiment.

Referring to a flow chart of FIG. 12, the process procedure for narrowing down the usable material names from the material database is described.

To begin with, the design information management system 41 refers to the discrimination information in the "material use permission/non-permission" field, and selects the names of the materials, whose use is permitted, from the material database (step S101). Then, on the basis of the mapping information (classification/material name correspondency table), the design information management system 41 selects the material names corresponding to the component, for which the material selection is requested, from the list of the names of materials whose use is permitted (step S102). In step s102, the classification information corresponding to the component, for which the material selection is requested, is first acquired from the design information database, and the names of usable materials belonging to the component classification corresponding to the component are determined with reference to the mapping information (classification/material name correspondency table). With respect to each of the material names of the materials whose use is permitted, it is determined whether the material is usable for the component classification corresponding to the component. Thus, the names of usable materials for the component classification corresponding to the component are selected from the list of the names of the materials whose use is permitted. Thereafter, the design information management system 41 provides the client terminal 1 with the list of usable material list (step S103).

Figure 13:
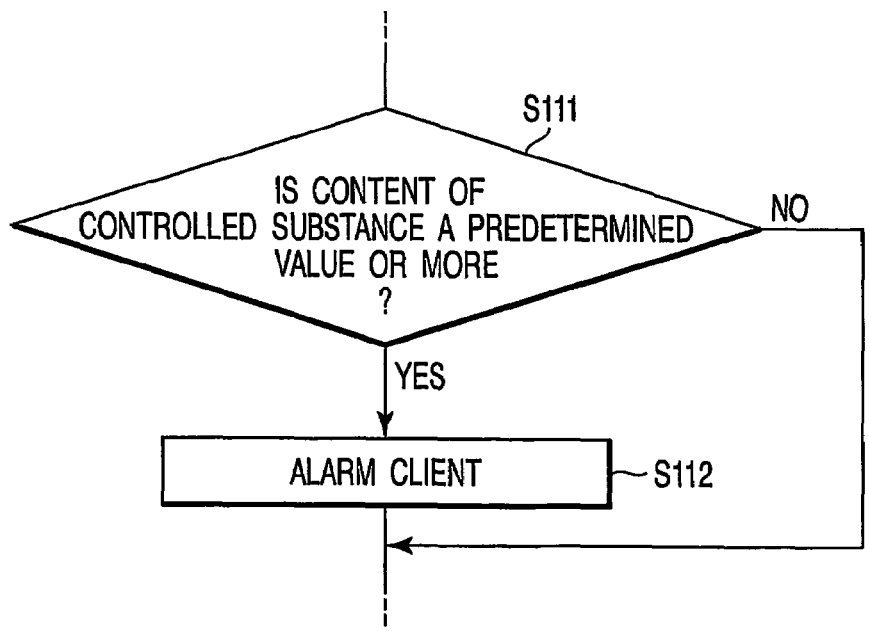
FIG. 13 is a flow chart illustrating an evaluation information output process that is executed by the design supporting system according to the embodiment.

Next, referring to a flow chart of FIG. 13, the process procedure that is executed by the determination unit 415 of the design information management system 41 is described.

The determination unit 415 determines whether the sum of the contents of controlled substances, which are calculated by the calculation unit 414, is a predetermined value or more, or whether the content of a specified controlled substance is a predetermined value, which is set for the specified controlled substance, or more (step S111). If the sum of the contents of controlled substances is the predetermined value or more, or if the content of a specified controlled substance is the predetermined value set for the specified controlled substance or more, the determination unit 415 sends a message to that effect to the client terminal 1 as an alarm. Thereby, the determination unit 415 prompts the client terminal 1 to execute re-design of the component or re-selection of the material (step S112).

By feeding back the evaluation information of the content of the controlled substance to the client terminal 1, the designer can re-design the component so as to reduce the component volume, or can re-select the material to be used.

Figure 14:
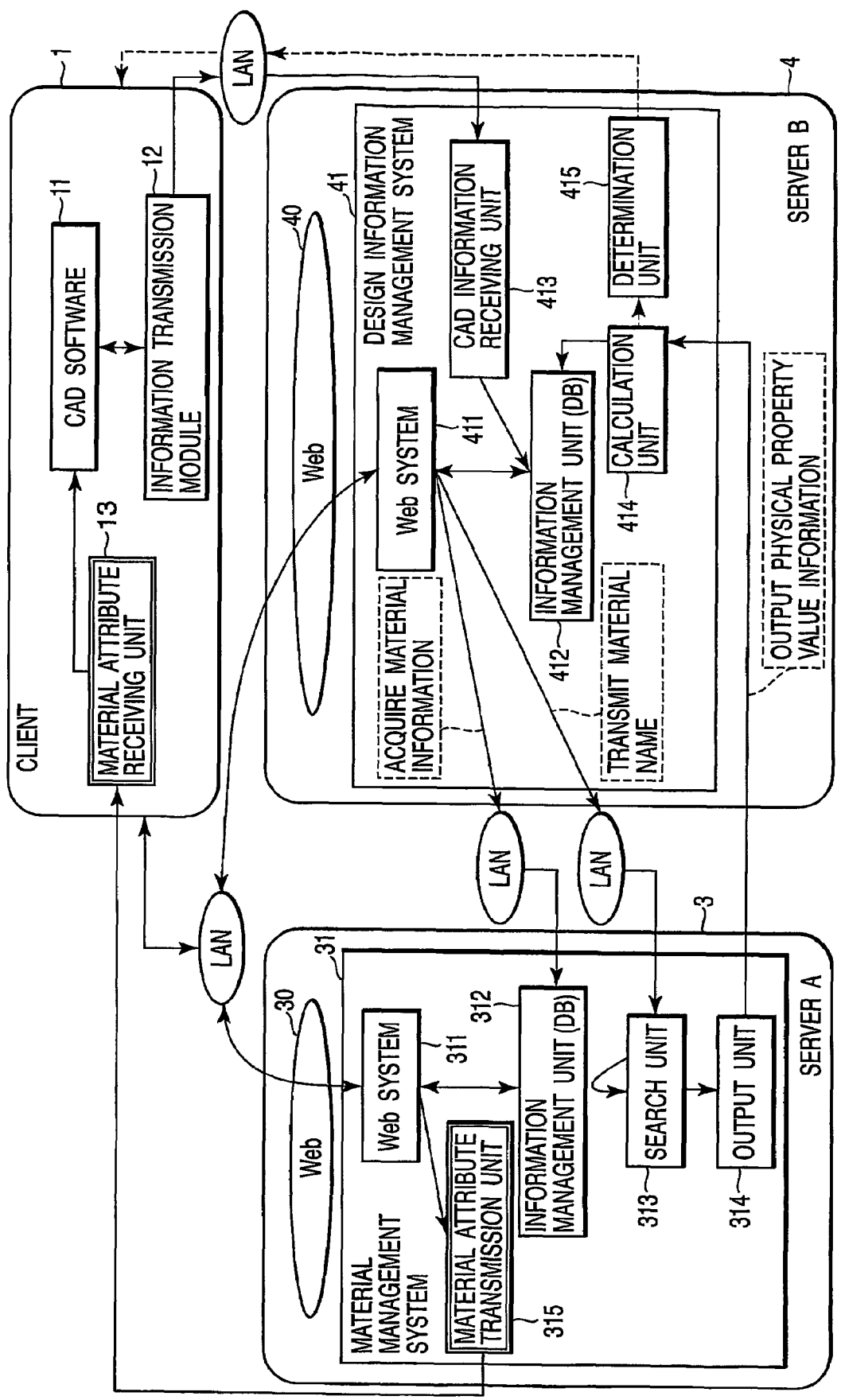
FIG. 14 is a block diagram that shows another structure of the design supporting system according to the embodiment.

FIG. 14 shows another example of the structure of the client terminal 1 and material management system 31.

In the system shown in FIG. 14, a material attribute transmission unit 315 is added to the material management system 31, and a material attribute receiving unit 13 is added to the client terminal 1. The material attribute transmission unit 315 transmits material attribute information (material name, physical property value), which is registered in the material database, to the client terminal 1 over the network. The material attribute receiving unit 13 receives the material attribute information from the material attribute transmission section 315 and writes it in the CAD software 11. By writing the material attribute information (material name, physical property value), which is registered in the material database, into the CAD software 11 of the client terminal 1, the CAD software 11 itself is provided with the function of presenting the physical property values of respective materials to the designer.

The functions of the material management system 31 and design information management system 41 are realized by computer programs. Therefore, the same advantageous effects as with the present embodiment can be obtained only by installing the computer programs in a computer, which is communicable with the client terminal 1, via a computer-readable storage medium that stores these computer programs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A design supporting system that is connected to a client terminal over a network and supports component design that is executed in the client terminal, the system comprising:
a storage device which stores a material database for managing, with respect to each of the materials in the material database, a material name of each material, controlled substance information indicative of a content of each of the controlled substances included in a material, and discrimination information indicative of a permission and non-permission, with respect to a use of a material;
a design information acquisition unit configured to cooperate with a component design supporting program which is executed by the client terminal, and acquire, from the component design supporting program via the network, component design information including volume information indicative of a volume of a component which is designed using the component design supporting program;
a determination unit configured to determine, when a material selection request relating to the designed component is input from the client terminal via the network, whether each of the materials stored in the material database is a usable material for a component classification corresponding to the designed component, based on the discrimination information and information indicative of a relationship between the component classification and usable materials for the component belonging to the component classification;
a generation unit configured to generate, based on a result of the determination, list information indicative of a list of names of usable materials for the component classification corresponding to the designed component, and send the list information to the client terminal over the network;
a controlled substance information acquisition unit configured to acquire, from the material database, controlled substance information corresponding to the material name which is selected from the list information by the client terminal;
a calculation unit configured to calculate, based on the acquired controlled substance information and the volume information included in the acquired component design information, a content of the controlled substance which is included in the designed component when the material of the selected material name is applied to the designed component; and
an output unit configured to output the calculated content of the controlled substance as evaluation information of the designed component.

2. The design supporting system according to claim 1, wherein the output unit includes means for determining whether the calculated content of the controlled substance is a predetermined value or more, and means for prompting, when it is determined that the calculated content of the controlled substance is a predetermined value or more, the client terminal over the network to execute one of re-design of the component and re-selection of the selected material.

3. The design supporting system according to claim 1, wherein the calculation unit is configured to multiply the content of each controlled substance, which is designated in the controlled substance information, by the volume information, thereby calculating the content of the controlled substance that is included in the designed component when the material of the selected material name is applied to the designed component.

4. The design supporting system according to claim 1, further comprising:
a database reference request input unit configured to receive a database reference request, which is transmitted from the client terminal over the network; and
a unit configured to provide information of the material database to the client terminal in response to the input database reference request.

5. A program which is stored in a computer-readable medium and causes a computer, which can execute communication with a client terminal over a network, to support component design that is executed in the client terminal, the program comprising:
causing the computer to execute a process of managing a material database which manages, with respect to each of the materials in the material database, a material name of each material, controlled substance information indicative of a content of each of the controlled substances included in a material, and discrimination information indicative of a permission and non-permission, with respect to a use of a material;
causing the computer to execute a process of acquiring component design information including volume information indicative of a volume of a component, which is designed using a component design supporting program that is executed by the client terminal, from the component design supporting program via the network;
causing the computer to execute a process of determining, when a material selection request relating to the designed component is input from the client terminal via the network, whether each of the materials stored in the material database is a usable material for a component classification corresponding to the designed component, based on the discrimination information and information indicative of a relationship between the component classification and usable materials for the component belonging to the component classification;
causing the computer to execute a process of generating, based on a determination result of the material determination process, list information that is indicative of a list of names of usable materials for the component classification corresponding to the designed component, and sending the material name list information to the client terminal over the network;
causing the computer to execute a process of acquiring, from the material database, controlled substance information corresponding to the material name that is selected from the list information by the client terminal;
causing the computer to execute a process of calculating, based on the acquired controlled substance information and the volume information included in the acquired component design information, a content of the controlled substance that is included in the designed component when the material of the selected material name is applied to the designed component; and
causing the computer to execute an evaluation information output process of outputting the calculated content of the controlled substance as evaluation information of the designed component.

6. The program according to claim 5, wherein said causing the computer to execute the evaluation information output process includes causing the computer to execute a process of determining whether the calculated content of the controlled substance is a predetermined value or more, and causing the computer to execute a process of prompting, when it is determined that the calculated content of the controlled substance is a predetermined value or more, the client terminal over the network to execute one of re-design of the component and re-selection of the selected material.

7. The program according to claim 6, wherein said causing the computer to execute the calculation process includes causing the computer to execute a process of multiplying the content of each controlled substance, which is designated in the controlled substance information, by the volume information, thereby calculating the content of the controlled substance that is included in the designed component when the material of the selected material name is applied to the designed component.

8. The program according to claim 5, further comprising:
causing the computer to execute a process of inputting a database reference request, which is transmitted from the client terminal over the network; and
causing the computer to execute a process of providing information of the material database to the client terminal in response to the input database reference request.

9. A method of supporting component design that is executed in a client terminal, with use of a computer that can execute communication with the client terminal over a network, the method comprising:
executing a process of managing a material database that manages, with respect to each of the materials in the material database, a material name of each material, controlled substance information indicative of a content of each of the controlled substances included in a material, and discrimination information indicative of a permission and non-permission, with respect to a use of a material;
executing a process of acquiring component design information including volume information indicative of a volume of a component, which is designed using a component design supporting program that is executed by the client terminal, from the component design supporting program via the network;
executing a material determination process of determining, when a material selection request relating to the designed component is input from the client terminal via the network, whether each of the materials stored in the material database is a usable material for a component classification corresponding to the designed component, based on the discrimination information and information indicative of a relationship between the component classification and usable materials for the component belonging to the component classification;
executing a process of generating, based on a determination result of the material determination process, list information that is indicative of a list of names of usable materials for the component classification corresponding to the designed component, and sending the list information to the client terminal over the network;
executing a process of acquiring, from the material database, controlled substance information corresponding to the material name that is selected from the list information by the client terminal;
executing a process of calculating, based on the acquired controlled substance information and the volume information included in the acquired component design information, a content of the controlled substance that is included in the designed component when the material of the selected material name is applied to the designed component; and
executing an evaluation information output process of outputting the calculated content of the controlled substance as evaluation information of the designed component.

10. The method according to claim 9, wherein said executing the evaluation information output process includes executing a process of determining whether the calculated content of the controlled substance is a predetermined value or more, and executing a process of prompting, when it is determined that the calculated content of the controlled substance is a predetermined value or more, the client terminal over the network to execute one of re-design of the component and re-selection of the selected material.

11. The method according to claim 9, wherein said executing the calculation process includes executing a process of multiplying the content of each controlled substance, which is designated in the controlled substance information, by the volume information, thereby calculating the content of the controlled substance that is included in the designed component when the material of the selected material name is applied to the designed component.

12. The method according to claim 9, further comprising:
executing a process of inputting a database reference request, which is transmitted from the client terminal over the network; and
executing a process of providing information of the material database to the client terminal in response to the input database reference request.

* * * * *